United States Patent
Wright et al.

(10) Patent No.: US 8,157,989 B2
(45) Date of Patent: Apr. 17, 2012

(54) FILTER RELIEF VALVE AND FILTER CARTRIDGE ASSEMBLY SEAL

(75) Inventors: Allen Buhr Wright, Hope Mills, NC (US); L. Steven Cline, Fayetteville, NC (US); Brian Glenn Yates, Holly Springs, NC (US)

(73) Assignee: Purolator Filters NA LLC, Fayetteville, NC (US)

( * ) Notice: Subject to any disclaimer, the term of this patent is extended or adjusted under 35 U.S.C. 154(b) by 0 days.

(21) Appl. No.: 11/401,197

(22) Filed: Apr. 10, 2006

(65) Prior Publication Data

US 2007/0235374 A1 Oct. 11, 2007

(51) Int. Cl.
*B01D 35/14* (2006.01)
*B01D 35/147* (2006.01)
*B01D 35/00* (2006.01)

(52) U.S. Cl. ......... 210/130; 210/136; 210/450; 210/435

(58) Field of Classification Search .................. None
See application file for complete search history.

(56) References Cited

U.S. PATENT DOCUMENTS

| | | | |
|---|---|---|---|
| 3,305,095 A | 2/1967 | Hathaway | |
| 3,473,664 A | 10/1969 | Hultgren | |
| 3,567,023 A * | 3/1971 | Buckman et al. | 210/130 |
| 3,785,491 A * | 1/1974 | Dudinec et al. | 210/130 |
| 4,144,168 A | 3/1979 | Thornton | |
| 4,872,976 A | 10/1989 | Cudaback | |
| 5,284,579 A | 2/1994 | Covington | |
| 5,405,527 A * | 4/1995 | Covington | 210/130 |
| 6,136,183 A | 10/2000 | Suzuki et al. | |
| 6,375,836 B1 * | 4/2002 | Yano et al. | 210/130 |
| 6,595,372 B1 * | 7/2003 | Minowa et al. | 210/440 |
| 6,793,808 B2 | 9/2004 | McKenzie | |

* cited by examiner

*Primary Examiner* — Nam Nguyen
*Assistant Examiner* — Madeline Gonzalez
(74) *Attorney, Agent, or Firm* — Crowell & Moring LLP

(57) ABSTRACT

A filter includes a housing having a cavity. A media pack, which includes a filter media, is arranged within the cavity and includes a central opening extending between opposing ends of the media pack. A center tube is arranged within the central opening and extends out of the central opening beyond one of the ends to provide a first end. A relief valve is supported on the first end. The filter cartridge assembly is installed into the housing with the relief valve in sealing engagement with a tapping plate of the housing. The relief valve performs the function of a seal between the filter cartridge assembly and the tapping plate in addition to performing pressure relief functions.

14 Claims, 3 Drawing Sheets

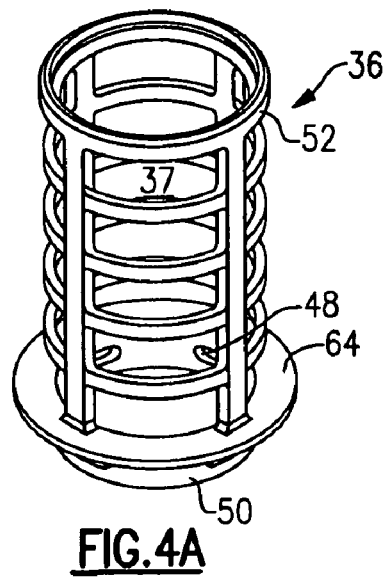
FIG.4A
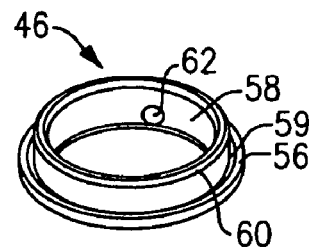
FIG.5A
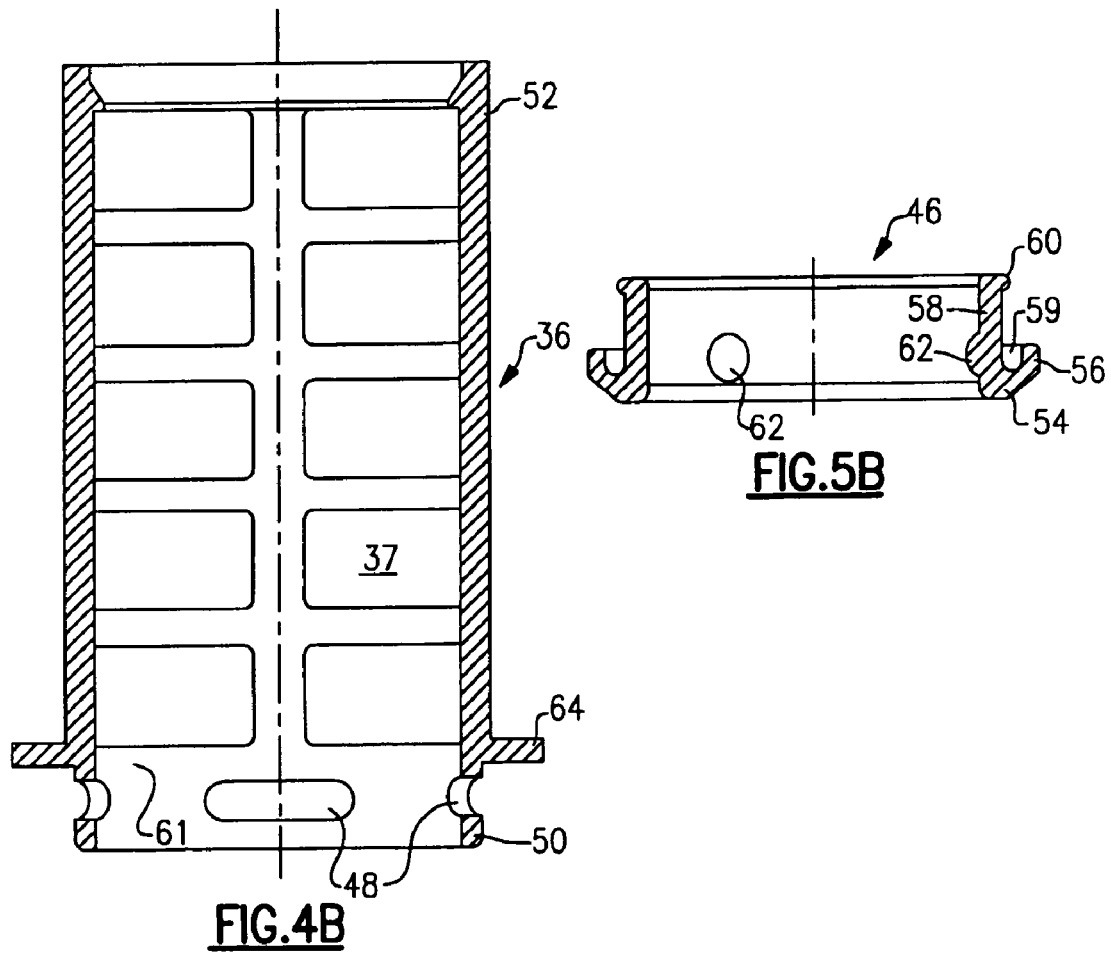
FIG.4B
FIG.5B

FILTER RELIEF VALVE AND FILTER CARTRIDGE ASSEMBLY SEAL

BACKGROUND OF THE INVENTION

This invention relates to a relief valve for a filter that also acts as a seal between a filter cartridge assembly and a housing of the filter.

A typical spin-on filter includes a housing that has a tapping plate with a threaded aperture. The threaded aperture provides an outlet for the filter and is screwed onto a mounting block stud to fluidly connect the filter with an engine oil circulation system, for example.

A filter cartridge assembly is arranged within the housing to filter debris in the oil. The filter cartridge assembly must seal relative to the housing to ensure that oil flows through the filter cartridge assembly under desired conditions. Some filter designs utilize a distinct, separate elastomeric gasket to seal the filter cartridge assembly to the tapping plate. Other filter designs rely upon a plastic-to-metal or metal-to-metal sealing between the filter cartridge assembly and the tapping plate. Using a separate elastomeric gasket as a component in the filter can increase cost and complicate assembly. Relying upon metal or a rigid plastic to seal against the tapping plate requires very good sealing surfaces and alignment.

What is needed is a good seal between the filter cartridge assembly and the tapping plate that does not add cost or complicate assembly of the filter.

SUMMARY OF THE INVENTION

The present invention provides a filter that includes a housing having a cavity. A media pack, which includes a filter media, is arranged within the cavity and includes a central opening extending between opposing ends of the media pack. A center tube is arranged within the central opening and extends out of the central opening beyond one of the ends to provide a first end. A relief valve is supported on the first end. In one example embodiment, a filter cartridge assembly includes the media pack, center tube and a guide. The filter cartridge assembly is installed into the housing with the relief valve in sealing engagement with a tapping plate of the housing. In this manner, the relief valve performs the function of a seal between the filter cartridge assembly and the tapping plate in addition to performing typical pressure relief functions.

In one example embodiment, an anti-drainback valve is also supported by the center tube. The anti-drainback valve includes an annular lip that is in sealing engagement with the tapping plate when in a closed position. The annular lip of the anti-drainback valve is arranged outboard of the relief valve. The relief valve includes a lip that is in sealing engagement with an inner surface of the center tube when in a closed position.

Accordingly, the present invention provides a simple seal between the filter cartridge assembly and the housing using the relief valve without adding an additional component to the filter.

These and other features of the present invention can be best understood from the following specification and drawings, the following of which is a brief description.

BRIEF DESCRIPTION OF THE DRAWINGS

FIG. 4A is a perspective view of a center tube shown in FIG. 1.

FIG. 4B is a cross-sectional view of the center tube shown in FIG. 4A.

FIG. 5A is a perspective view of the relief valve shown in FIG. 1.

FIG. 5B is an enlarged cross-sectional view of the relief valve shown in FIG. 5A.

DETAILED DESCRIPTION OF THE PREFERRED EMBODIMENT

Figure 1:
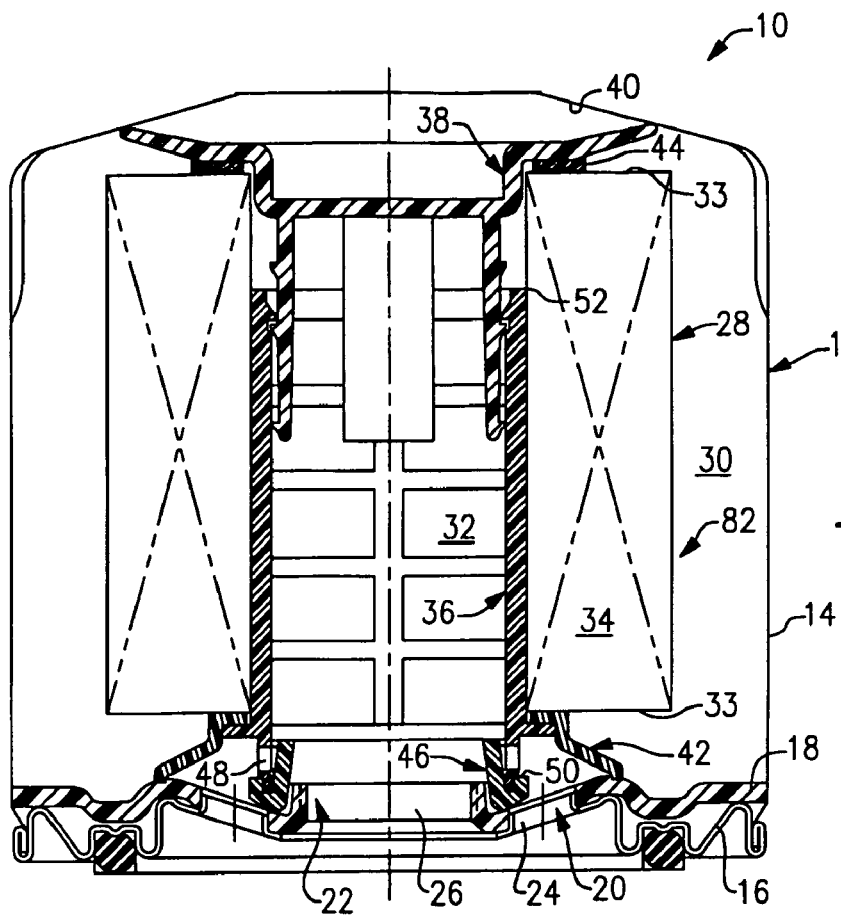
FIG. 1 is a cross-sectional view of a filter using the inventive relief valve arrangement.

A filter 10 is shown in FIG. 1 and is representative of a typical spin-on oil filter. The filter 10 includes a housing 12 having a can 14 that provides a cavity. A retainer 16 is secured to the can 14 to retain a tapping plate 18. The tapping plate 18 includes an inlet 20 provided by multiple apertures 24 arranged circumferentially about an outlet 22. The outlet 22 is provided by a threaded hole 26 that is used to secure the filter 10 to a mounting block (not shown).

A media pack 28 is arranged within the housing 12 to filter debris from the oil. Oil flows into the housing 12 through the inlet 20 to an inlet side 30 of the media pack 28. Oil passes through the media pack 28 and exits to an outlet side 32 and flows through the outlet 22.

Figure 2:
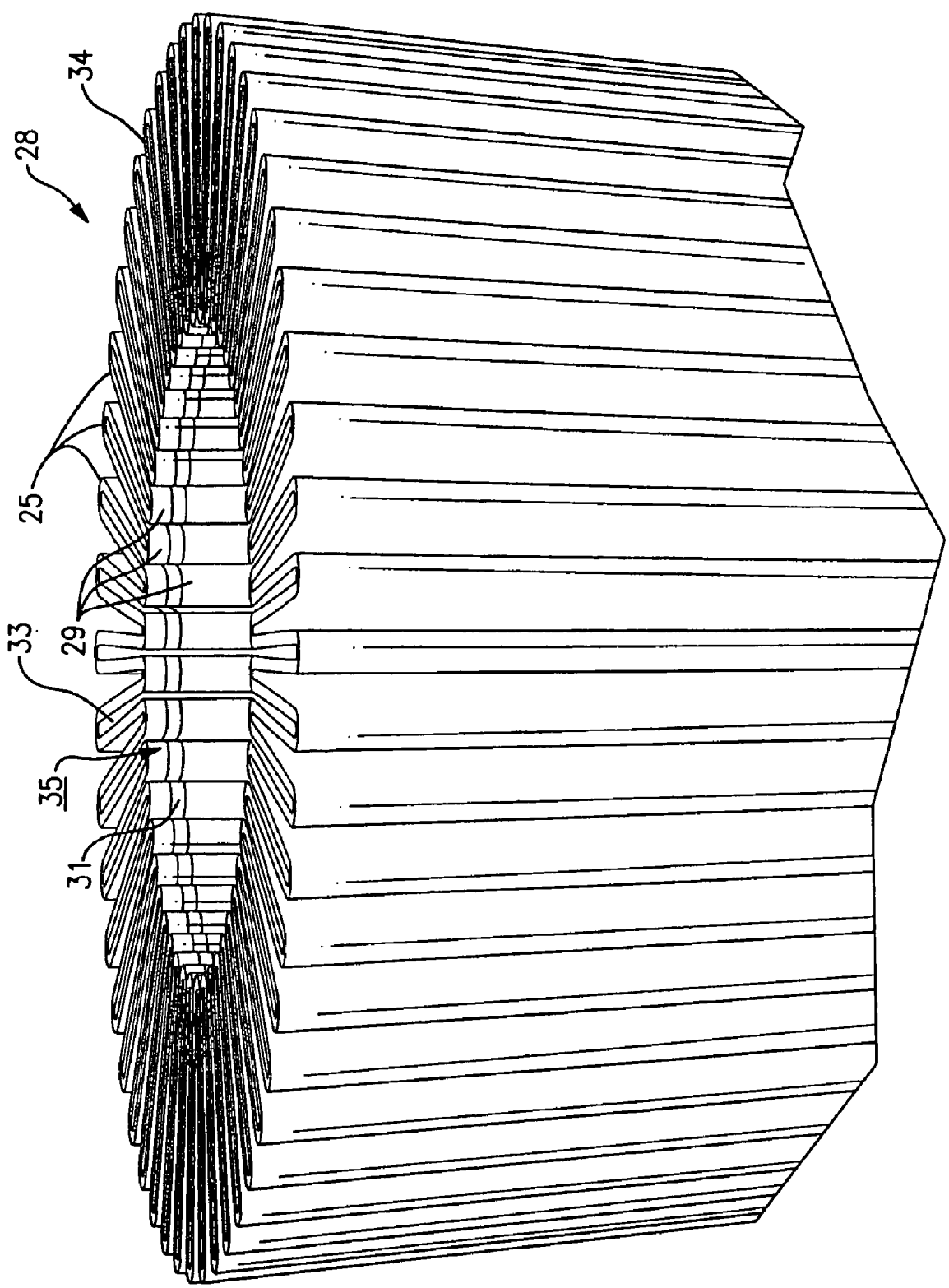
FIG. 2 is a perspective view of a media pack used in the filter shown in FIG. 1.

The media pack 28 includes a filter media 34 for debris removal. The filter media 34 can be arranged between two end caps in a known manner (not shown). Alternatively, the media pack 28 may be provided using the filter media 34 arranged in a pocket-pleated arrangement, shown in FIG. 2. The filter media 34 includes pleats 25 arranged in pockets, as is known in the art. The pleats 25 are by secured beads of adhesive 31 near each of opposing ends 33, to form the pockets, so that the inner edges 29 are in close proximity to one another. The inner edges 29 provide a central opening 35 that extends between the ends 33. Using a filter media 34 of the type shown in FIG. 2 permits the elimination of end caps that are typically secured to the ends 33. Instead, flexible seals are arranged at the ends 33 and extend to the inner edges 29 to ensure that oil flows from the inlet side 30 to the outlet side 32 without bypassing the filter media 34.

Returning to FIG. 1, a center tube 36 is arranged within the central opening 35 (FIG. 2) to support the inner edges 29 so that the filter media 34 does not collapse inwardly under oil pressure. The center tube 36 is a unitary structure in the example shown and includes openings 37 (shown in FIGS. 4A-4B) that permit oil to flow through the center tube 36. A guide 38 is secured to the center tube 36. The guide 38 engages a wall 40 of the housing 12 to position and load the components within the filter 10 as desired. To seal the filter media 34, a seal 44 is provided between the filter media 34 and the guide 38. An anti-drainback valve 42 is arranged between the other end 33 and the center tube 36 to provide a seal. A relief valve 46 is supported by a first end 50 of the center tube 36 while an opposing second end 52 of the center tube is used to secure the guide 38 with an interlocking connection, in the example shown. The anti-drainback valve 42, seal 44 and relief valve 46 are constructed from suitable materials, such as elastomers, to provide an adequate seal between the adjacent components.

Referring to FIGS. 5A and 5B, the relief valve 46 includes a base 54 from which outer and inner legs 56 and 58 extend. A groove 59 is arranged between the outer and inner legs 56 and 58 to provide a J-shaped cross-section. The inner leg 58 includes a lip 60 that engages an inner surface 61 (FIG. 4B) of the center tube 36. The relief valve 46 includes multiple protrusions 62 arranged at its inner diameter to ease assembly of the relief valve 46 onto the first end 50. The inner leg 58 blocks openings 48 (FIG. 4B) in the center tube 36 when the relief valve 46 is in the closed position, which is shown in FIGS. 1 and 3A.

Figure 3A:
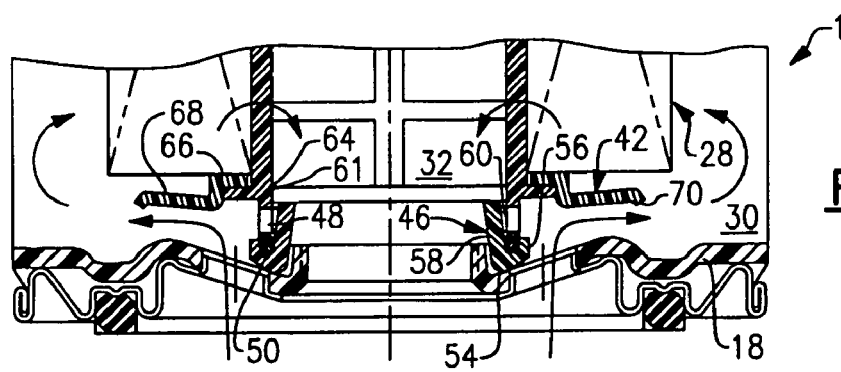
FIG. 3A is a cross-sectional view similar to that shown in FIG. 1 with an anti-drainback valve in an open position and a relief valve in a closed position.

Referring to FIGS. 3A-4B, the center tube 36 includes a seat 64 that extends outwardly from the center tube 36. The anti-drainback valve 42 includes an annular flange 66 that is supported on the seat 64 and acts as a seal between the center tube 36 and the end 33 (FIG. 1), which is shown in FIGS. 3A and 3B. An intermediate portion 68 extends radially outward and toward the tapping plate 18 to an annular lip 70 that is in sealing engagement with the tapping plate 18 when the anti-drainback valve 42 is in a closed position, which is shown in FIG. 3B.

Returning to FIG. 3A, the annular lip 70 is shown disengaged from the tapping plate 18, which illustrates an open position of the anti-drainback valve 42. The anti-drainback valve 42 is in the open position during normal operating conditions to permit oil to flow into the filter 10. The anti-drainback valve 42 closes to prevent debris from the dirty side of the filter media 34 from draining back to the engine when it is not running. The relief valve 46 is shown in the closed position with the lip 60 in sealing engagement with the inner surface 61.

Figure 3B:
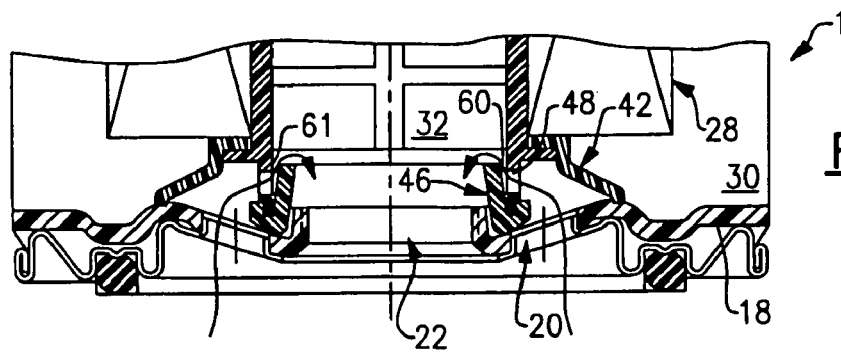
FIG. 3B is a cross-sectional view of a filter similar to that shown in FIG. 1 with the anti-drainback valve in a closed position and the relief valve in an open position.

Referring to FIG. 3B, the anti-drainback valve 42 is shown in the closed position. The relief valve 46 is shown in the open position with the lip 60 disengaged from the inner surface 61 to permit oil to flow directly from the inlet 20 through the openings 48 and out the outlet 22. The relief valve 46 moves to the open position under high oil pressure conditions or when the filter media 34 has become clogged to bypass the filter media 34.

Referring to FIG. 1, the media pack 28, center tube 36, guide 38, seal 44 and anti-drainback valve 42 provide a filter cartridge assembly 82. The relief valve 46 acts as a seal between the filter cartridge assembly 82 and the tapping plate 18. In particular, the base 54 is in engagement with the tapping plate 18, in the example shown.

The inner leg 58, which moves between the open and closed positions (FIGS. 3B and 3A), is arranged at the interior of the center tube 36 so as not to interfere with the operation of the anti-drainback valve 42. The intermediate portion 68 and annular lip 70, which move between the open and closed positions (FIGS. 3A and 3B) are arranged radially outwardly of the inner leg 58 so as not to interfere with the operation of the relief valve 46.

The filter 10 is relatively easy to assemble compared to prior art filter arrangements. First, the anti-drainback valve 42 is installed onto the center tube 36 so that the annular flange 66 is supported on the seat 64. Alternatively, the anti-drainback valve 42 can be over molded onto the center tube 36. The second end 52 of the center tube 36 is inserted into the central opening 35 of the media pack 28. The seal 44 is installed onto the guide 38. The seal 44 may also be glued to the guide 38 or over molded onto it. The guide 38 is secured to the center tube 36 using the interlocking connection. The center tube 36 and guide 38 are loaded so that the anti-drainback valve 42 and seal 44 are in good sealing engagement with the opposing ends 33 of the media pack 28.

The relief valve 46 is installed onto the filter cartridge assembly 82 so that the first end 50 is seated in the groove 59. The filter cartridge assembly 82 is then inserted into the cavity provided by the can 14. The tapping plate 18 is secured to the can 14 using the retainer 16, as is well known in the art. The base 54 of the relief valve 46 seals against the tapping plate 18.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A filter comprising:
    a housing providing a cavity;
    a filter cartridge assembly including a media pack arranged within the cavity and having a central opening extending between opposing ends of the media pack; and
    a relief valve supported on the filter cartridge assembly and in sealing engagement with the housing,
    wherein a center tube is arranged in the central opening of the media pack, the center tube extending out of the central opening beyond one of the opposing ends to provide a first end, the relief valve supported on the first end, and wherein the center tube is a unitary structure,
    wherein said center tube supports said media pack and has a plurality of openings on a longitudinal axis for connecting said media pack and said central opening,
    wherein the center tube includes first end openings in a portion of the center tube extending beyond the one of the opposing ends of the media pack, and the first end openings are blocked by a leg of the relief valve when the leg is in a closed position and unblocked by the leg when the leg is in an open position, and
    wherein the relief valve includes a plurality of protrusions disposed on an inner surface of the leg, the protrusions projecting radially inward from the inner surface toward the longitudinal axis.

2. The filter according to claim 1, wherein the media pack includes a filter media having pleats with inner edges that provide the central opening, the center tube adjacent to the inner edges.

3. The filter according to claim 1, wherein the housing includes a tapping plate providing an inlet and outlet, the relief valve is in sealing engagement with the tapping plate.

4. The filter according to claim 1, wherein an anti-drainback valve is in sealing engagement with the media pack and a portion of the center tube that projects radially outward.

5. The filter according to claim 1, wherein the relief valve includes open and closed positions, the relief valve being in sealing engagement with the housing in both the closed and open positions.

6. The filter according to claim 5, wherein the relief valve includes a J-shaped cross-section.

7. The filter according to claim 6, wherein the relief valve includes an inner leg in sealing engagement with an inner surface of a center tube when the relief valve is in the closed position, the inner leg movable between the open and closed positions.

8. The filter according to claim 7, wherein an outer leg of the relief valve is arranged radially outwardly of the inner leg, a groove provided between the inner and outer legs, the first end of the center tube supported within the groove.

9. A filter comprising:
a center tube having first and second ends spaced from one another, a seat extending radially from the center tube and arranged between the first and second ends;
a relief valve supported on the first end forming a seal with a housing of the filter; and
an anti-drainback valve supported on the seat and extending radially outward from the seat and toward the first end,
wherein said center tube is unitary, wherein the anti-drainback valve is in sealing engagement with a media pack arrange about the center tube,
wherein said center tube supports said media pack and has a plurality of openings for connecting said media pack and an interior region of said center tube,
wherein the relief valve includes a leg movable between open and closed positions, the leg arrange radially inward from an annular lip of the anti-drainback valve that is movable between open and closed positions,
wherein the center tube includes an opening that is blocked by the leg of the relief valve when in the closed position, the leg moving away from the opening when in the open position, and
wherein the relief valve includes a plurality of protrusions disposed on an inner surface of the leg, the protrusions projecting radially inward from the inner surface toward the longitudinal axis.

10. The filter according to claim 9, wherein the anti-drainback valve includes a stationary portion that is closest to a leg of the relief valve when the relief valve is in a closed position, the leg moving away from the stationary portion when the leg moves from the closed position to an open position.

11. A method of assembling a filter comprising the steps of:
a) providing a filter cartridge assembly;
b) installing a relief valve onto the filter cartridge assembly; and
c) assembling the filter cartridge assembly into a housing so that the relief valve is in sealing engagement with the housing,
wherein step a) includes inserting a center tube into a media pack with a first end of the center tube extending out of the media pack and wherein said center tube is a unitary structure, supports said media pack, and has a plurality of openings on a longitudinal axis for connecting said media pack and an interior region of said center tube,
wherein the center tube includes first end openings in a portion of the center tube extending beyond the media pack, and the first end openings are blocked by a leg of the relief valve when the leg is in a closed position and unblocked by the leg when the leg is in an open position, and
wherein the relief valve includes a plurality of protrusions disposed on an inner surface of the leg, the protrusions projecting radially inward from the inner surface toward the longitudinal axis.

12. The method according to claim 11, wherein step b) includes installing the relief valve onto the first end with a leg of the relief valve in engagement with an inner surface of the center tube when in a closed position, the leg moveable to a position spaced from the inner surface when in an open position.

13. The method according to claim 11, wherein step a) includes installing an anti-drainback valve onto the center tube prior to installing the media pack onto the center tube.

14. The filter according to claim 9, wherein the anti-drainback valve is in sealing engagement with the seat.

* * * * *